United States Patent [19]
Bastien

[11] 4,184,393
[45] Jan. 22, 1980

[54] SHEAR TO CUT LENGTHS OF ELONGATED METAL ELEMENTS

[75] Inventor: Pierre Bastien, Sainte Foy les Lyon, France

[73] Assignee: Etablissements A. Mure, Rhone, France

[21] Appl. No.: 903,921

[22] Filed: May 8, 1978

[30] Foreign Application Priority Data

May 12, 1977 [FR] France ................................ 77-15188

[51] Int. Cl.² .................. B26D 5/40; B26D 7/06; B23Q 7/00
[52] U.S. Cl. .................................... 83/155.1; 83/159; 83/208; 83/230; 83/262; 83/369; 83/391; 83/268
[58] Field of Search .................. 83/109, 155, 155.1, 83/158, 159, 160, 208, 262, 263, 282, 424, 391, 268, 269, 230, 261

[56] References Cited

U.S. PATENT DOCUMENTS

| | | | |
|---|---|---|---|
| 1,435,979 | 11/1922 | Reed | 83/261 |
| 2,818,115 | 12/1957 | Parker | 83/369 |
| 3,101,638 | 8/1963 | Rhicard et al. | 83/230 X |
| 3,670,614 | 6/1972 | Streckert | 83/208 |
| 3,906,825 | 9/1975 | Schenck et al. | 83/155.1 |
| 3,978,703 | 9/1976 | Primich et al. | 83/261 X |
| 4,108,032 | 8/1978 | Scheib et al. | 83/159 X |

*Primary Examiner*—Donald R. Schran
*Attorney, Agent, or Firm*—Browdy and Neimark

[57] ABSTRACT

A device to cut lengths of elongated metal elements, including a shear, an incoming belt for delivering the metal elements to the shear, an outgoing belt for delivering the metal elements from the shear after they are cut, a retractable stop, between the incoming and outgoing belt, for aligning the metal elements and establishing a reference point from which the length to be cut is measured, two motors, one to drive each belt, and a shaft between the motors to ensure that the motion of each belt is synchronous after the elongated metal elements reach the reference point.

5 Claims, 9 Drawing Figures

SHEAR TO CUT LENGTHS OF ELONGATED METAL ELEMENTS

FIELD OF THE INVENTION

The field of the present invention is a shear for cutting elongated metal elements to predetermined lengths, designed in particular for shearing round reinforcing bars.

BACKGROUND OF THE INVENTION

Round reinforcing bars are generally bundled in lots weighing about 5 tons, and have a length of 12 to 18 meters. Obviously there is a relatively broad range of round bars with different cross sections adapted for use with different structures to be built.

The shearing of round reinforcing bars can be organized in two principal ways, as a function of the quantity of steel to be sheared every day, which can be a function of the size of the company carrying out the work.

The first method is to prepare all the elements in one order before going on to those in the next order. Each type of bar is stored in a bin and the shear is mounted so that it can move in front of the bins and be brought up to those containing various types of bars to be sheared one at a time. When the shear has passed all the bins, the order is finished and ready for shipping.

Another method is to group a certain number of orders together, such as all the orders for one day. Within this group of orders, or manufacturing program, all the bars of a given diameter are combined so that the same type of product can be worked on for a relatively lng period of time.

Generally, when several orders are combined, each batch of the same type of bar may total 5 tons. In this case, it is more efficient to move the 5 ton batch up to the shear point than to move the shear relative to the batch of bars.

However, this faster method has the disadvantage of making it necessary to sort the bar diameters after shearing, in order to fill the original orders.

The various operations involved in cutting by this second method are the following:

sorting the bars into 5-ton batches of the same diameter to feed them one by one;

grouping together a number of bars to be cut simultaneously;

moving these bars up to the shear;

measuring the length to be cut;

shearing;

taking cut bars away from the shear;

removal of the cut bars;

storing these bars in appropriate bins.

Traditional shearing systems using this method thrust the bars mechanically or manually against stops at a distance from the shear corresponding to the length to be cut.

Since commercial bars are 12 to 18 meters long, to avoid waste, a long length and a short length are frequently cut from the same bar to achieve optimum utilization. Thus, the stop must be adjusted over a long distance each time the bar is cut, which is time-consuming, or several stops must be available, involving complicated machinery and high cost.

In addition, most machines of this type move the bars at high speed over metal rollers. However, in general the bars are not smooth but serrated or ribbed so that the noise caused by their movement is extremely loud, on the order of 110 decibels.

SUMMARY OF THE INVENTION

The present invention is aimed at providing a device of the latter type wherein the bars can be positioned with great ease before cutting, and wherein the movement of bars is relatively noise-free.

The invention comprises a shear, incoming and outgoing conveyors comprising endless belts with an anti-skid surface, and a retractable stop.

The shear used in a classic shear of the type whose blades remain open except when they are given a precise order to cut, and then return to their waiting open position. The width of the belt is adapted to the width of the shear used.

The number of bars to be cut, which is a function of the width of the belt, is placed on an incoming feed belt. The feed belt is made of rubber, for example providing sufficient adhesion so that the bars do not slip as they move forward. Since the belt moves at the same rate as the bars, one need only measure the belt feed distance to measure the bar feed length.

When the cutting long lengths, it is essential for the movement of the incoming belt during the feed phase before shearing to be perfectly synchronized with the movement of the outgoing belt. This is because all of the bars to be cut are resting on the outgoing belt when they are cut, while measurement of the length to be cut is always performed on the incoming belt. The belts are each driven by their own variable-speed direct-current motor, each motor being controlled by a speed control. Synchronization is provided by an electrically powered shaft coupling the two motors.

Advantageously, the invention includes a feed-belt-speed governor with a programming device having gentle acceleration and deceleration stages. This avoids any risk of the bars slipping on the belts due to an abrupt acceleration while they are starting and stopping. In addition, the adjustable stop adjacent to the shear, aligns the bars and establishes a reference point, from which the length to be cut is measured.

It is important to have a reference point, because the length of the bar to be cut will be determined by the distance through which the belt has moved from this point of reference. The alignment device may be composed either of a hydraulic stop adjacent to the shear and independent of the movement of the cutting blade, or may be composed of the shear cutting blade itself when the latter is in a shearing position.

Once the stop is in position, when the bar feed belt is made to move forward at low speed, the bars will be aligned in the cutting plane. The stop is then retracted to allow the bars to pass and to allow movement and measurement.

When the stop is retracted the counter is zeroed.

Advantageously, a programming system may be associated with this device in order to achieve automatic starting and stopping.

Once the bars have moved for the desired distance, one needs only actuate the shear to cut them.

After the cutting operation, the cut parts of the bars are advantageously removed without moving the parts of the bars situated on the incoming belt, which are ready for a new operation.

To achieve this goal, a device is provided enabling the outgoing belt to be uncoupled from the incoming belt. The cut bars can then move away on the outgoing belt up to the point where they are to be dropped into appropriate receptacles.

BRIEF DESCRIPTION OF THE DRAWINGS

The invention is described hereinbelow with reference to the schematic drawing attached representing several embodiments of this device as nonlimitative examples.

Figure 1:
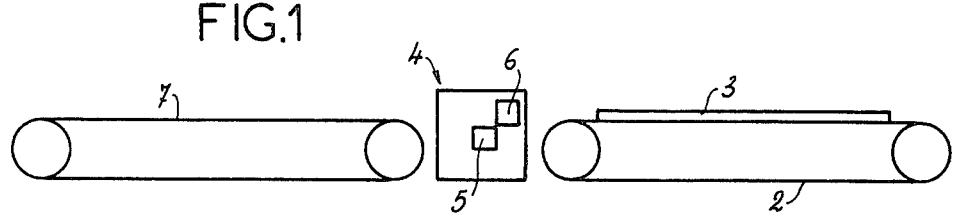
FIG. 1 is a highly schematic side view of the principal assemblies of this machine.
Figure 2:
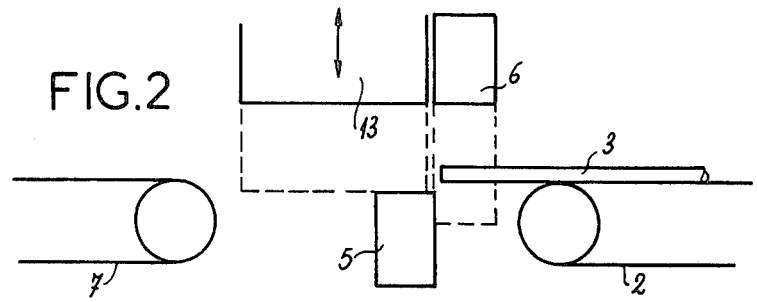
FIGS. 2 and 3 are two schematic side views of the shear.
Figure 3:
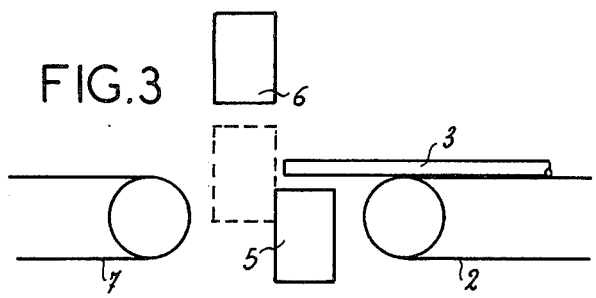

The machine shown in FIGS. 1, 2 and 3 has an endless incoming belt 2 and receiving bars 3 coming from a batch. Belt 2 has a surface made of an antiskid material such as rubber. This belt 2 brings the bars 3 to a shear assembly 4 having a fixed lower blade 5 and a movable blade 6. Downstream from the shearing assembly 4 is an outgoing belt 7 with the same characteristics as belt 2.

Figure 4:
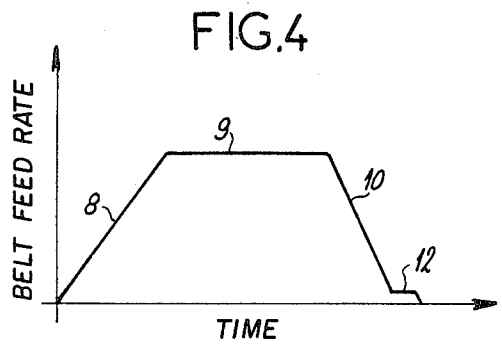
FIGS. 4 and 5 are two diagrams indicating the belt feed rate as a function of time in the phase preceding shearing.

Incoming belt 2 is connected to a device enabling the bars 3 to contact it without sliding over it. For this purpose, a programmable feed rate governor (not shown) controls the movement of the belt 2, to prevent a sudden transition from zero to maximum speed. As shown in FIG. 4, which is a plot of belt feed rate versus time, there is an acceleration slope 8 during the starting period, a period of steady maximum speed 9, and a deceleration slope 10.

In the case of manual control, it is advantageous to have a low-speed level 12 in order to adjust the speed, and therefore the length through which the belt 2 and bars 3 move exactly.

Figure 5:
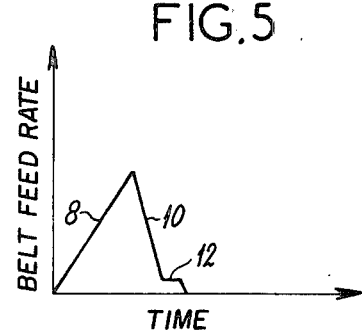

FIG. 5 is a diagram similar to that of FIG. 4 but in which the desired bar feed rate is too slow to reach the constant maximum speed level. In this case, there is a direct transition from acceleration slope 8 to deceleration slope 10.

When a number of bars 3 is positioned on incoming belt 2, these bars 3 are brought into contact with a hydraulic stop 13, in the low position, situated at the level of the cutting plane as shown in FIG. 2. It should be noted that, as shown in FIG. 3, this stop 13 may consist of the upper shear blade 6, in the low position. When incoming belt 2 is activated at low speed, it brings all the bars 3 in contact with the stop, which ensures that the bars 3 are properly aligned; the stop also establishes a reference point from which the length to be cut is measured. When the bars 3 contact the stop, a counter in the stop (not shown) is set to zero.

Each belt 2, 7 is driven by a variable speed direct-current motor (not shown). A shaft can couple the two motors so that their movement is synchronous.

After the stop has been retracted, belts 2 and 7 are driven synchronously for a distance corresponding to the desired bar length.

After the belts 2 and 7 have stopped, cutting is effected by action of the shear 4. Belt 7 is then uncoupled from belt 2 so that the cut bars can be removed.

Figure 6:
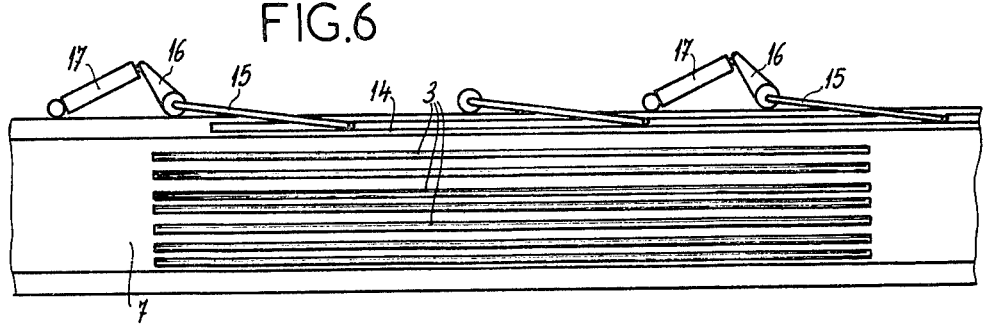
FIGS. 6 and 7 are two top views of the outgoing belt.
Figure 7:
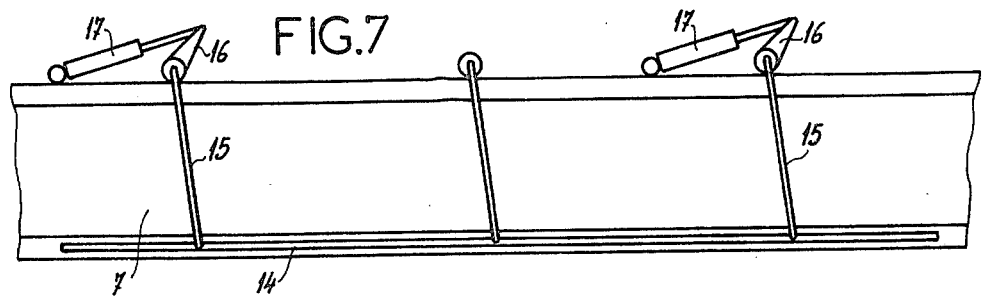

The bars are brought to a zone where they can be disengaged laterally. The device for such lateral disengagement, as shown in FIGS. 6 and 7, comprises a guide bar 14, parallel to belt 7, and displaceable parallel and transversally thereto, because the bar 14 is pivotally mounted at the end of connecting rods 15, constituting a deformable parallelogram. These rods 15 are activated by smaller rods 16 which themselves are attached to pneumatic jacks 17. Since guide bar 14 is situated just above the upper part of belt 7, namely the part on which the cut bars rest, the bars can be disengaged when jacks 17 are activated.

Figure 8:
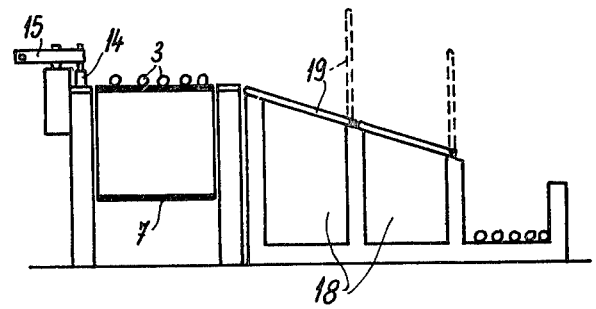
FIGS. 8 and 9 are two cross-sectional views of the outgoing belt before and after the outgoing belt is uncoupled from the incoming belt respectively.
Figure 9:
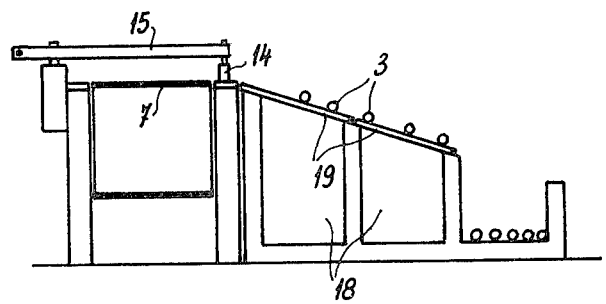

As shown in FIGS. 8 and 9, on the bar disengagement side, it is advantageous to provide several bins 18 of different heights, the highest bin 18 being situated next to belt 7. Each of bins 18 can be closed by a cover 19. The position of cover 19 associated with bins 18 determine which bin will receive the bars to be removed. It is possible, for example, depending on the case in question, to allocate one bar length or one bar cross section to each bin.

Depending on the length of outgoing belt 7, it is possible to have several series of bins aligned with each other.

It will be obvious to those skilled in the art, that various changes may be made without departing from the scope of the invention, and the invention is not to be considered limited to what is shown in the drawings and described in the specification.

What is claimed is:

1. A work station for cutting lengths of elongated, rigid metal elements, the station comprising:
    a cutting stage for cutting elongated metal elements, said cutting stage including shear means formed by two cutting members at least one of which is moveable;
    an incoming conveyor to convey elongated metal elements to be cut into said cutting stage, said incoming conveyor being an endless belt having an antiskid surface on which the elements are to be carried;
    an outgoing conveyor to convey cut elongated, rigid metal elements away from said cutting stage, said outgoing conveyor being an endless belt with an antiskid surface on which cut lengths of the elements are to be carried;
    a retractable stop formed by a moveable one of said cutting members which when in a given non-cutting position engages the elongated metal elements which are to be cut with a non-cutting surface and functions as an alignment block to align the elongated metal elements and to establish a reference point from which the length to be cut is measured; and
    synchronous drive means for driving said incoming conveyor and said outgoing conveyor synchronously, after the elongated metal elements contact said retractable stop and said cutting member which functions as an alignment block returns to a second non-cutting position, to advance the metal elements to a given length to be cut.

2. A work station for cutting lengths of elongated metal elements according to claim 1 further comprising a programmable belt-feed-rate governor to control the speed of said incoming conveyor so as to stop said incoming conveyor after the elongated metal elements have travelled a predetermined length past the reference point.

3. A work station for cutting lengths of elongated metal elements, according to claim 2, further including uncoupling means, attached to said outgoing conveyor, for uncoupling said incoming conveyor from said outgoing conveyor.

4. A work station for cutting lengths of elongated metal elements, according to claim 1, further including a lateral disengagement means for the lateral disengagement of the cut elongated metal elements from said outgoing conveyor.

5. A work station for cutting elongated metal elements according to claim 4, wherein said lateral disengagement means comprises a guide bar parallel to and above the surface of said outgoing conveyor;

connecting rods pivotally connected to one end of said guide bar; and pneumatic jacks pivotally connected to the other end of said connecting rods, so that when said pneumatic jacks are actuated, said jacks are displaced parallel to said guide bar and said guide bar engages said elongated metal elements and is displaced transversally across said outgoing conveyor.

* * * * *